Sept. 5, 1967 M. RINALDI 3,340,524

DEVICE FOR THE DIGITAL DISPLAY OF DATA STORED IN ELECTRONIC CIRCUITS

Filed Jan. 30, 1964 2 Sheets-Sheet 1

INVENTOR.
Massimo Rinaldi
BY
Mason, Fenwick & Lawrence
ATTORNEYS

Massimo Rinaldi INVENTOR.
BY
Mason, Fenwick & Lawrence
ATTORNEYS 3,340,524

DEVICE FOR THE DIGITAL DISPLAY OF DATA STORED IN ELECTRONIC CIRCUITS

Massimo Rinaldi, Rome, Italy, assignor to Industria Macchine Elettroniche—I.M.E.—S.p.A.

Filed Jan. 30, 1964, Ser. No. 341,172
Claims priority, application Italy, Mar. 8, 1963, 4,543/63; Mar. 18, 1963, 5,336/63
6 Claims. (Cl. 340—324)

ABSTRACT OF THE DISCLOSURE

Digital readout and display apparatus for visible digital display of binary coded data in magnetic-core memories, including gas-discharge numerical display tubes, having digit electrodes. A binary-to-decimal decoding matrix has digit outputs connected to the digit electrodes and a magnetic-core matrix memory has column windings connected through column circuits to a common electrode of respective ones of the display tubes and has row windings arranged in groups connected through row control circuits and AND gates to the decoding matrix. A scanning circuit sequentially controls the column circuits to activate visual display by the digit electrodes, and control pulses are applied to the circuits in selected sequence to control readout from the matrix memory and storage therein.

This invention relates to a device for the digital display of data stored in electronic circuits.

Many electronic apparatus require provision for a decoded readout in decimal digits of the data which is stored in code form within electronic circuits. Examples of such apparatus are electronic counters of various types, electronic memories, and electronic data processors or the like.

The stored data usually is displayed by means of incandescent lamps, by gas indicators either in decade arrays, with one lamp for each digit, or by means of projecting numerical elements or gas decimal numerical display devices, or by means of other devices well known in the art.

For all these display devices an intermediate decoding and amplifying device is required for driving the element concerned with each digit.

In many electronic apparatus, particularly computers, data is stored in memories consisting of matrices of magnetic cores having particular features.

According to the invention there is provided a device for the digital display of data stored in electronic circuits comprising a set of decimal digital display devices arranged to be actuated sequentially through a decoding matrix at such a frequency as to provide the appearance of a continuous display due to the inertia of the element and/or to persistence of the image in the eye.

The invention also consists in a readout device on digital display devices for data stored in magnetic memories comprising a magnetic memory matrix having columns adapted to be read out separately and their contents supplied to the corresponding display device at such a frequency as to provide the appearance of a continuous display due to the persistence of the image on the retina of the eye and/or the activation inertia of the display device.

In a preferred embodiment according to the invention, the display device comprises an array of numerical indicators of a kind comprising ten symbol or digit displaying electrodes, corresponding to the symbols from 1 to 9 and zero, and an individual common reference electrode, which for their activation, i.e. illumination, require a voltage applied between said common reference electrode and the numerical symbol electrode, above a predetermined threshold in order that, if all the display devices have their symbol electrodes connected in parallel, the supply of one-half of the operating voltage on one of the symbol electrodes, and of the other half on said reference electrodes of a given indicator, results in the energization and consequent display of the number (figure) pertaining to said one of the symbol electrodes. If the numerical indicator satisfy the above cited requirements, it will be possible to display any decimal number having a number of figures not greater than the number of indicators included in the above-mentioned array by supplying said half-voltage to the individual reference electrodes of the indicators of the array and the other half-voltage to the symbol electrodes in the sequence corresponding to the value of each figure of the decimal number to be displayed, the progressive display thereof will be obtained.

According to a further feature of the invention, the same number display devices may enable the contents of more than one group of electronic elements to be read by sending an energizing signal to the outputs of the electronic elements of only the desired group.

The invention will now be particularly described by way of example with reference to the accompanying drawings in which.

Figure 1:
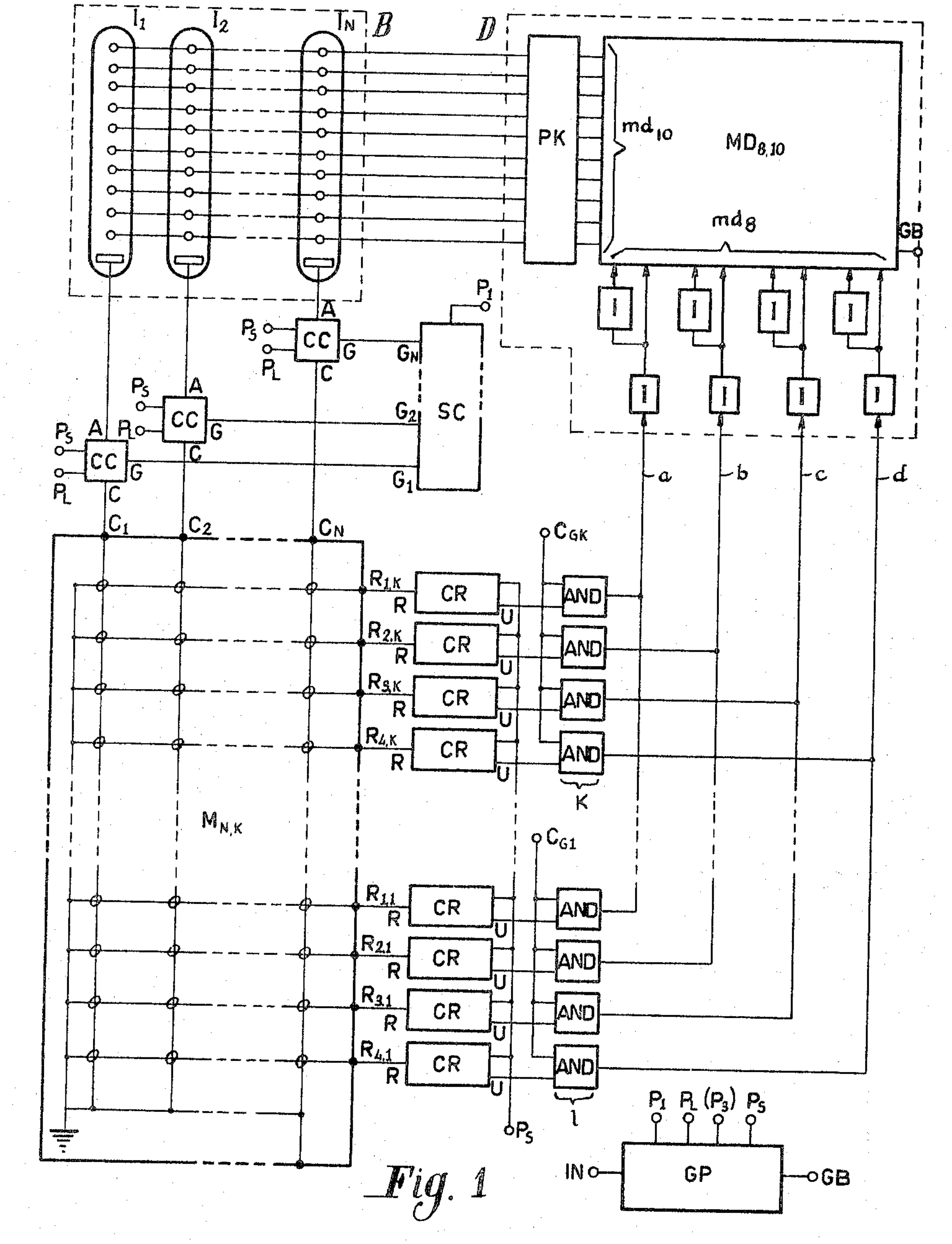
FIGURE 1 is a diagram of a display device according to the invention.

With reference to FIGURE 1 of the drawings, the display device includes a group B of indicator tubes $I_1$, $I_2$, . . . $I_N$ which comprise, for instance, gas discharge numerical display tubes, for instance of the kind known in the art or "Nixie" tubes, manufactured by Burroughs Corporation, U.S.A.

These indicator tubes comprise a set of ten cathodes shaped as the numerals 1, 2, . . . 0, and a common anode.

The glow discharge gas tubes, as it is well known, are characterized by a threshold voltage, which might be, for instance, two-thirds of the operating voltage. This characteristic results in the fact that a given indicator tube will light only when two voltages of suitable polarity and magnitude are applied to the common anode and a selected one of the cathodes.

The above-mentioned indicator tubes $I_1$, $I_2$ . . . $I_N$ have their digit electrodes paralleled and connected to a set of drive amplifiers shown schematically as block PK (an individual amplifier for each cathode wire is provided) the inputs of which are connected to the outputs $md_{10}$ of a decoding matrix $MD_{8,\ 10}$, shown together with amplifiers PK in the broken line block D.

The decoding matrix $MD_{8,\ 10}$ is a well known decoding matrix arranged for the conversion from the binary-coded decimal system, into the usual base-ten numbers. In the particular embodiment disclosed, the matrix $MD_{8,\ 10}$ carries out the conversion from the code 1–2–4–8 to the decimal system.

The inputs $md_8$ of the matrix $MD_{8,\ 10}$ are individually connected with the outputs of inverters I arranged to provide both the direct and complemented replica of the signals appearing on lines *a*, *b*, *c*, *d*, connected with the outputs of the AND circuits of the groups 1, . . . K.

The inputs of the AND circuits of the groups 1, . . . K are connected with the corresponding outputs of the row circuits CR of the groups 1, . . . K, respectively, and with common gating terminals CGI, CGK, respectively, the purpose of which is to select the display of a given decimal number among the K numbers available on the outputs of the K row circuits CR.

The row circuits CR will be disclosed in detail hereinafter.

The row circuits CR are connected with the row windings of a magnetic-core memory matrix $M_{N,K}$.

The magnetic-core memory matrix $M_{N,K}$ comprises a set of column windings (wires) and row windings (wires) in the crossing of which magnetic cores having rectangular hysteresis loops are linked.

In the particular embodiment herein disclosed, the memory matrix $M_{N,K}$ comprises K groups of four row windings, and N column windings shown as $R_{1,1}$ . . . $R_{4,1}$; . . . $R_{1,K}$, $R_{2,K}$, . . . $R_{4,K}$ and $C_1$, $C_2$, $C_N$, respectively.

The row and column windings are connected to row circuits CR and column circuits CC, respectively and to a common return point (ground).

Figure 2:
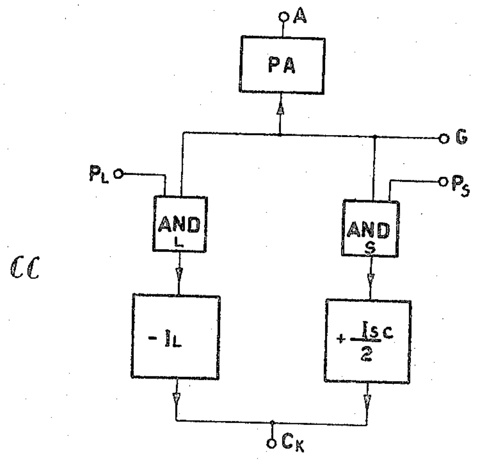
FIGURE 2 is a detailed diagram of one of the column circuit blocks CC shown in FIGURE 1.
Figure 3:
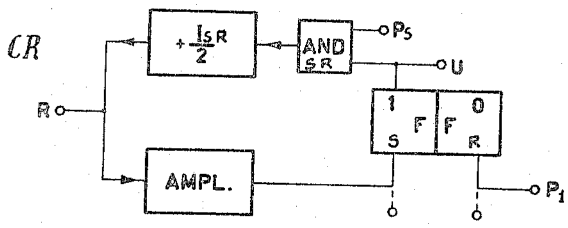
FIGURE 3 is a detailed diagram of one of the row circuit blocks CR shown in FIGURE 1.

The row circuits CR, and the column circuits CC are shown in detail in FIGURES 2 and 3 respectively.

As shown in FIGURE 2, the column circuits CC include two constant current generators indicated as $-I_L$ and $+I_{SC/2}$, the outputs of which are connected to terminal $C_K$, which is representative of the connections to the column windings of the memory matrix $M_{N,K}$. The current generators $-I_L$ and $+I_{SC/2}$ are connected with the output terminals of the gate circuits $AND_L$ and $AND_S$, respectively.

The gate circuit $AND_L$ has two inputs connected to terminal $P_L$ and terminal G. The gate circuit $AND_S$ has two inputs connected to terminal $P_S$ and terminal G. The terminal G is also connected to the input of an amplifier PA, the output of which is connected to terminal A.

Terminal A is representative of the anodes of the indicator tube shown in broken line block B.

In FIGURE 3 the arrangement of row circuits CR is shown in detail. The terminal R, representative of one of the row windings, is connected to the input of the amplifier AMPL and to the output of the current generator $+I_{SR/2}$. The current generator $+I_{SR/2}$ is connected to the output of the gate circuit $AND_{SR}$, having two inputs, R, $P_S$ and U. Input U is connected with the ONE output of bistable flip-flop FF, the set input of which is connected with the output of the amplifier AMPL, and the reset input of which is connected to terminal $P_1$.

Figure 4:
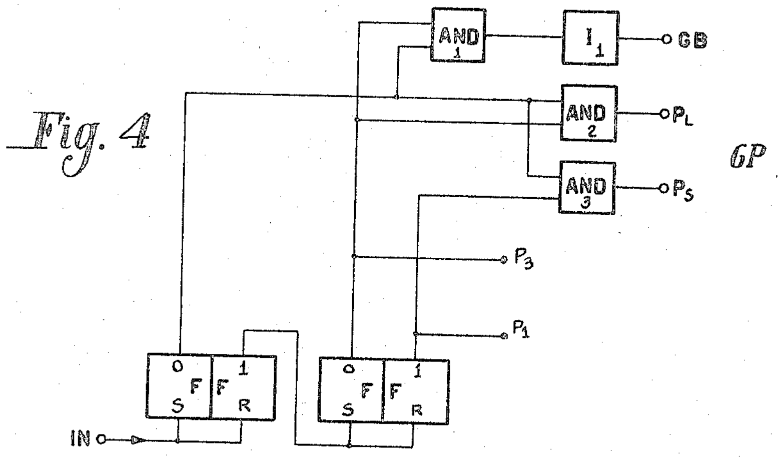
FIGURE 4 is a detailed diagram of another of the blocks shown in FIGURE 1.

In FIGURE 4 the pulse generator GP is shown in detail.

The circuit includes two cascade connected bistable flip-flops FF1, FF2. The circuit comprises three AND gates AND 1–AND 3.

The input connections of these AND circuits are the following:

AND 1: ZERO of FF1, ZERO of FF2
AND 2: ZERO of FF1, ZERO of FF2
AND 3: ZERO of FF1, ONE of FF2

On terminals GB, $P_L$, $P_S$, $P_3$, $P_1$ a sequence of pulses appears. The order of the sequence is the following:

(GB) (GB)
$P_1$ $P_L$ $P_3$ $P_S$ $P_1$ $P_L$ $P_3$ $P_S$ etc., the terminals GB, $P_L$, $P_S$, $P_3$, $P_1$ are connected to the several terminals designated by similar reference characters in FIGURES 1, 2 and 3.

The column circuits CC, have a terminal G, which is respectively connected, for each CC circuit, to the outputs $G_1$, $G_2$, . . . GN of a scanner SC. The purpose of the scanner SC is to control the sequence of operations of the indicator tubes $I_1$, . . . $I_N$ and of the circuits associated with the column windings $C_1$, . . . $C_N$.

The operation of the circuit is as follows:

The column circuit CC carries out two functions when energized; it applies through the driver or amplifier circuit PA, a priming voltage to the common electrode anode of the associated numerical indicator. This voltage, for example, for a digital gas display tube, may correspond to one-half of the ignition voltage. If incandescent lamps are utilized, the supply is connected to the common terminals of the lamps associated to a display device.

By means of the two constant current generators $-I_L$ and $+I_{S/2}$, the circuit will cause either a current $-I_L$ or $+IS_{/2}$, respectively, to flow in the column winding, if together with the gating pulse G, there is present the reading out control pulse $P_L$ or the writing control pulse $P_S$, respectively.

The current $-I_L$ is able to cause by itself the reversal of the magnetization in all cores of the column which are oppositely magnetized. The current $I_{S/2}$ by itself is unable to re-magnetize the cores while the double current $I_S$ is capable of so doing.

The row circuits CR include the amplifier AMPL for amplifying the pulse which is generated when the magnetization of core of the associated memory row is reversed. The output pulse from said amplifier is sent to set the flip-flop circuit FF.

The current generator $+I_{SR/2}$ is energized by the coincidence of the signal coming from the flip-flop circuit FF, if set, with the presence of the writing control pulse $P_S$. The flip-flop circuit FF can be reset by applying a suitable pulse $P_1$.

The scanner circuit SC can take any form well known to persons skilled in the art. For instance, it could be a binary counter with an associated decoding matrix, a ring counter or the like, and its features must be to deliver an energizing signal sequentially to only one of its outputs $G_1$, . . . $G_N$ simultaneously with the sending of stepping pulses $P_1$.

The decoding block D includes the circuits necessary for transforming into a decimal signal on ten wires, only one of which is actuated, a coded signal applied to the input thereof. In the case of 1, 2, 4, 8 binary code (four wires) there will be four pairs of inverters I for restoring the 1 and 0 signal, and a decoding matrix $MD_{8,10}$ transforming the code into ten wires decimal code.

The driving circuits PK allow the delivery to all the paralleled digit electrodes a voltage corresponding to the input signal from the matrix $M_{8,10}$. For a gas discharge indicator, this voltage could be one-half of the ignition voltage having of course the opposite polarity with respect to the voltage applied by the column circuit. A gate GB allows all outputs to be cut out.

The control pulse generator GP generates a series of pulses in the following sequence:

- $P_1$, a scanner stepping pulse and reset pulse for flip-flops FF included in the line circuit CR;
- $P_L$, the content readout control pulse;
- $P_3$, a pulse needed for the possible associated circuits varying the contents of the memory;
- $P_S$, the writing control pulse;
- GB, a de-energizing signal existing in the interval between $P_1$ and $P_1$.

In the actual display operation, the circuit operates as follows:

An oscillator not shown in the drawings sends pulses at the input IN of the circuit GP which thereupon delivers the described sequence of pulses to the various circuits.

After receiving a pulse $P_1$, the scanning circuit SC will have energized one column and the pertaining indicator while all the flip-flops FF of the row circuits are reset. No display device is, however, activated as the signal GB is also present. The display devices at this stage mark 0. When the pulse $P_L$ is supplied to the column circuit, the magnetization of all those cores of the energized column which had previously been magnetized in the direction corresponding to the signal "1" is reversed. The flip-flops FF associated with all those rows in which a reversal of magnetization occurs, i.e., all those rows in which an information "1" was present in the cores, will be set. At the input of the decoder D, accordingly, a coded signal will be delivered corresponding to the information previously stored in the energized memory column. As the memory can consist of several groups of rows, a set of "AND" circuits, conditioned by the presence of a gate $CG_1$, . . . $CG_K$, delivers at the input of the decoding circuit the contents of the sole group which it is desired to read on the display devices. The pulse $P_3$ might be utilized in associated circuits in order to change the contents of the information which during this stage is present in the flip-flop circuits FF. These circuits FF can in fact be connected as a counter or they can receive setting or re-setting signals. The pulse $P_S$ carries out the re-writing of the information as changed by the associated circuits controlled by $P_3$, if this should occur, onto the cores of the energized column. The information of the pre-selected memory group concerning teh energized column D will appear decoded in the associated digital display device throughout the time from $P_L$ to the subsequent $P_1$.

By carrying out such an operation cycle at a sufficiently high repetition rate, the entire contents of a group of memories will appear decoded on the digital display devices and it will seem simultaneous due either to the inertia of the display device elements or to the persistence of the image in the operator's eye.

Hence it can be seen that the invention allows the information contained in a group of rows in the memory to be read on numerical luminous display devices of the gas, luminescent or incandescent types, with single or grouped digits, either direct-display or projecting display devices or on other similar display devices and it can be seen that this result may be obtained using only a single decoding circuit.

The invention may also provide the possibility of varying by other circuits the contents of the memories in order to introduce digits, to carry out computations, transfers of information and arithmetical operations.

It will be appreciated that the system allows the decoding and driving of the numerical elements concerned with many digits to be carried out by a single unit.

I claim:

1. A digital readout arrangement for visible display of binary coded data contained in magnetic-core matrix memories, comprising in combination a magnetic-core matrix memory including and array of row windings and an array of column windings, magnetic cores interlinked in the crossing of said row and column windings, a group of row circuits having inputs connected with the row windings of said matrix memory, and AND gates connected to the outputs thereof, a binary-to-decimal decoding matrix having inputs connected to said AND gates and having an individual output lead for each digit of the decimal system, a plurality of column circuits each connected with a corresponding one of said column windings of said matrix memory; a plurality of gas-discharge numerical display tubes each having a first electrode connected respectively with the output of each of said column circuits and having digit electrodes for each of the digits of the decimal system, each corresponding digit electrode of all of said display tubes being connected in common to a respective one of said output leads, and a scanning circuit having outputs individually connected with said column circuits for sequentially activating said column circuits for applying a voltage to said first electrodes of said display tubes to activate the digit electrodes thereof having signals thereon supplied from said output leads of said decoding matrix.

2. A digital readout arrangement according to claim 1, in which said magnetic-core matrix memory includes plural groups of row windings, said plural groups of windings being connected to individual groups of row circuits which are interconnected to the input of said decoding matrix through said AND gates.

3. A digital readout arrangement according to claim 1 in which said row circuits include for each of said row windings a current generator for producing a writing fraction-current which is a selected fraction of the current required to remagnetize said cores, a read amplifier, and a memory bistable circuit having output and input connected to said current generator and said amplifier, respectively.

4. A digital readout arrangement according to claim 2, in which said row circuits include for each of said row windings a current generator for producing a writing fraction-current which is a selected fraction of the current required to remagnetize said cores, a read amplifier and a memory bistable circuit having output and input connected to said current generator and said amplifier, respectively.

5. A digital readout arrangement according to claim 1 wherein said column circuit includes a writing fraction-current generator for producing a current which is a selected fraction of the current required to remagnetize said cores and a read full-current generator for producing a current capable of remagnetizing said cores, each of said generators being connected to a respective one of said column windings, said scanning circuit having outputs connected to said current generators for gating said column circuits sequentially with a predetermined repetition rate.

6. A digital readout arrangement according to claim 2, wherein said column circuit includes a writing fraction-current generator for producing a current which is a selected fraction of the current required to remagnetize said cores and a read full-current generator for producing a current capable of remagnetizing said cores, each of said generators being connected to a respective one of said column windings, said scanning circuit having outputs connected to said current generators for gating said column circuits sequentially with a predetermined repetition rate.

References Cited

UNITED STATES PATENTS

| | | | |
|---|---|---|---|
| 1,688,631 | 10/1928 | Hubbel | 340—324 |
| 2,871,462 | 1/1959 | Eggensperger | 340—324 |
| 2,962,698 | 11/1960 | Mathamel | 340—324 |
| 3,130,397 | 4/1964 | Simmon | 340—324 |
| 3,140,480 | 7/1964 | Glaser et al. | 340—324 |
| 3,165,728 | 1/1965 | Finney | 340—324 |
| 3,205,408 | 9/1965 | Lumpkin | 340—324 |
| 3,267,262 | 8/1966 | Stuart | 340—343 |

OTHER REFERENCES

Burkstein, E.: Readouts and Counter Tubes, Electronics World, 1959, pp. 57–59 and 138.

NEIL C. READ, *Primary Examiner.*

A. J. KASPER, *Assistant Examiner.*